United States Patent [19]

Scantland et al.

[11] 4,319,869
[45] Mar. 16, 1982

[54] LOADER DRIVE COMPENSATOR AND SAFETY DEVICE

[76] Inventors: Joseph F. Scantland, 2275 Rickel Dr., Akron, Ohio 44313; Thomas A. Flory, 2682 Kibler Rd., Akron, Ohio 44321

[21] Appl. No.: 145,444

[22] Filed: May 1, 1980

[51] Int. Cl.$^3$ .............................................. B29D 29/00
[52] U.S. Cl. ......................................... 425/38; 187/26
[58] Field of Search ....................... 187/26, 17, 20, 23, 187/71; 254/386; 425/38, 32, 33

[56] References Cited

U.S. PATENT DOCUMENTS

| | | | |
|---|---|---|---|
| 1,270,716 | 6/1918 | Flannery | 187/71 |
| 3,275,170 | 9/1966 | MacRae et al. | 187/26 |
| 3,924,983 | 12/1975 | Barton et al. | 425/38 |

*Primary Examiner*—David A. Scherbel
*Assistant Examiner*—Kenneth Noland

*Attorney, Agent, or Firm*—Oldham, Oldham, Hudak & Weber Co.

[57] ABSTRACT

A loader safety device for a tire curing press that has a frame with a pair of vertically extending side members and a support platform operatively mounted on the side members for vertical movement, and a tire-engaging device mounted on the support platform, wherein a cylinder with a piston rod operatively extending therefrom is positioned on the frame and its piston rod operatively engages a carriage movably mounted on the frame for movement laterally thereof, the cylinder-piston rod unit control the position of the carriage on the top portion of the frame; and a rotary device is mounted on the carriage with a flexible device being operatively anchored at one end to the frame and extending to and engaging the support platform at its other end, which support device operatively engages the rotary device so as to raise and lower the support platform with respective extension and retraction of the piston rod by pressures in the control cylinder.

6 Claims, 4 Drawing Figures

LOADER DRIVE COMPENSATOR AND SAFETY DEVICE

BACKGROUND OF THE INVENTION

This invention relates to tire curing presses, and especially to loader safety devices for such presses. Presses of the type to which the present invention relates are shown in U.S. Pat. No. 3,924,983, wherein a frame is provided that has a pair of vertically extending sides and a top secured to and extending between the sides. The tire curing press also includes a support platform operatively mounted on the sides for vertical movement, and tire engaging means mounted on the support platform. Such platform is movable to and from association with tire curing molds also positioned in the press. Some safety means are provided in these tire curing presses to try to insure safe operation of the presses with controlled vertical movement of the support platform as the press goes through tire curing cycles. These presses can involve relatively high pressures, and the support platform and its associated means can weigh from several hundred pounds up to over a thousand pounds, whereby controlling the position of this support platform on the sides of the frame is important so that no accidental movement of such platform should occur in the press when going through a tire curing cycle.

It is the general object of the present invention to provide a novel and improved safety device for a tire curing press and particularly one associated with the movable support platform of the press and the tire loaders carried by such safety platform for preventing accidental downward movement of the support platform and associated means.

Another object of the invention is to provide a novel loader safety device for tire curing presses of the class described, wherein loader means comprise members operably mounted on the press frame and including pressurized support cables, chains or the like to urge the support platform in the press upwardly under normal operating or release conditions.

Another object of the invention is to provide, in combination a fluid pressure supply means and pressure operated controls or valves responsive to the fluid pressure supply that couples to a control piston and cylinder unit in the safety device, and which is adapted to urge the support platform in the tire curing press upwardly under operating pressure failure conditions, and to permit operative movement of the support platform only when a desired pressure is supplied to the piston and cylinder unit.

Another object of the invention is to provide a safety device in tire curing presses of the type described, wherein the safety devices can be made from relatively conventional materials and equipment, and provide a mechanically sound, dependable and effective safety device for the support platform of the tire curing press.

The foregoing and other objects and advantages of the invention will be made more apparent as the specification proceeds.

Attention now is particularly directed to the accompanying drawing, wherein.

When referring to corresponding members shown in the drawings, and referred to in the specification, corresponding numerals are used to facilitate comparison therebetween.

SUBJECT MATTER OF THE INVENTION

Figure 4:
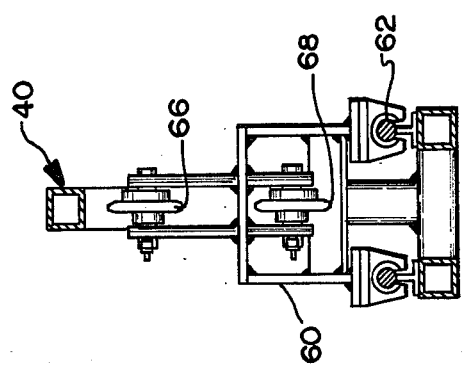
FIG. 4 is a vertical section taken on line 4—4 of FIG. 2.
Figure 1:
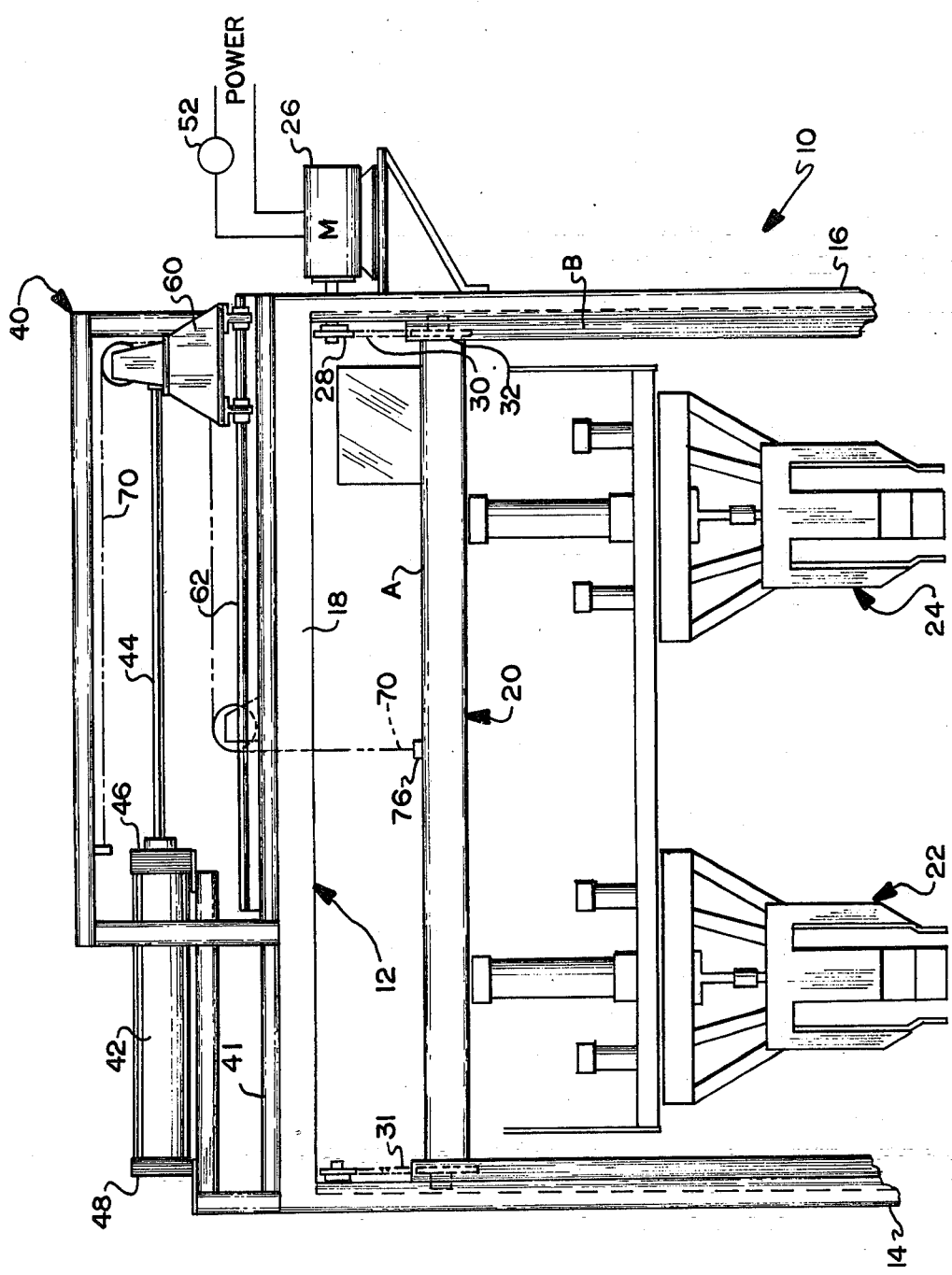
FIG. 1 is diagrammatic elevation of a tire curing press having a safety device of the invention positioned thereon.
Figure 3:
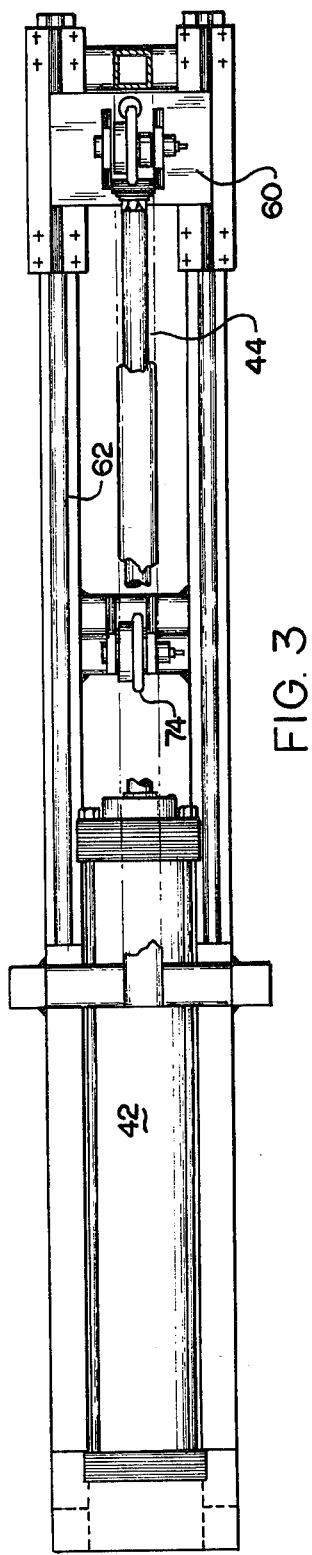
FIG. 3 is a top plan of the loader safety device of FIG. 2.

The loader safety device of the invention relates to a tire curing press that includes a frame having a pair of vertically extending side members, and usually a top member secured to and extending between the side members, a support platform mounted on the side members for vertical movement therealong, and tire loader and engaging means mounted on the support platform and dependent therefrom, which press is characterized by a cylinder having a piston rod extending therefrom and operatively secured to the frame, a carriage movably mounted in relation to the frame top member and engaged by the piston rod which controls the position of the carriage laterally of said top member, a rotary means mounted on the carriage, and a flexible support means operatively anchored at one end and extending to and engaging the support platform to support and position the same on the side members, these support means operatively engaging the rotary means to raise and lower the support platform with respective extension and retraction of the piston rod.

Attention now is particularly directed to the details of the construction shown in the drawings, and a tire curing press is indicated as a shown by the numeral 10. This press 10 includes a frame 12 that has a pair of side members 14 and 16 that are vertically extending, and a top frame member 18 normally secured to and extending between the side members adjacent or at their upper ends. The press 10 also includes a support platform 20 that is operatively mounted on the side members 14 and 16, and suitably engaged therewith, for vertical movement therealong. The support platform 20 has a pair of tire loader means 22 and 24 dependent therefrom and operatively carried thereby.

In the operation of the tire curing press 10, this support platform or member 20 moves up and down vertically of the side members 14 and 16 for positioning green tires in the curing molds and removing them therefrom as required in the operative cycle of the tire curing press.

The vertical position of the support platform 20 on the side members is suitably controlled, as by a drive motor 26. This drive motor 26 is suitably mounted on the frame 12 and, for example, may have its driveshaft connected to a drive sprocket 28 operatively positioned on the side frame member and engaging a suitable drive unit, such as an endless chain 30 or the like, that operably engages a control sprocket 32, suitably journalled on and carried by the support platform 20. Usually, drive chains 30, 31 are provided adjacent each side of the apparatus to engage platform 20 and any desired coupler means can extend between these chains and be controlled by the drive motor 26 to raise and lower the support platform 20 of the apparatus. All of this apparatus is generally as that shown in U.S. Pat. No. 3,924,983.

LOADER SAFETY DEVICE

The improved loader safety device of the invention usually includes a frame means 40 secured to and/or positioned on the press frame 12 at the top portion thereof, and which frame means 40 has a cylinder or other pressure operated means 42 secured thereto in a horizontal position and extending transversely of the press frame. This cylinder 42 is a uni-directional cylinder and a piston rod 44 engages a piston conventionally mounted in the cylinder and extends from operative end 46 of the cylinder 42, which has a blind or closed end 48.

Figure 2:
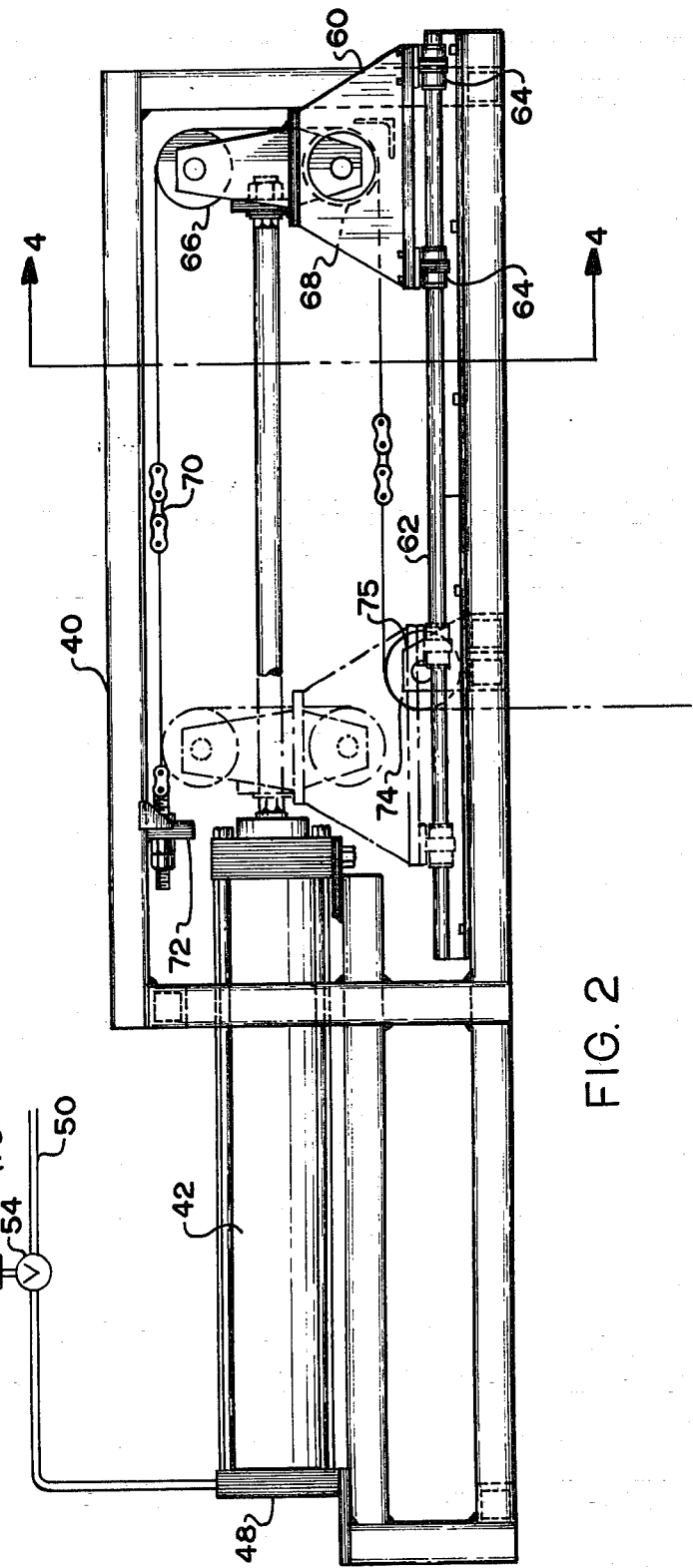
FIG. 2 is an enlarged side elevation of the loader safety device of the invention, as partially shown in FIG. 1.

For operation of the cylinder, a suitable source of fluid pressure connects to supply line 50, FIG. 2, and this supply line or tube 50 connects to the blind end 48 of the cylinder 42 for supplying pressure thereto continuously. A pressure actuated control switch 52 is provided and it is operated by the pressure in the line 50 by a member 54 and it opens under predetermined low pressure levels whereby desired pressures for operation of the safety means of the invention are insured. The switch 52 is suitably interlocked in the drive control circuit for the motor 26 so that such motor cannot move the platform 20 unless at least a predetermined pressure is supplied to the cylinder 42.

A carriage unit 60 is operably associated with the frame means 40, and it can be conventionally mounted on the tire curing press frame 12 or on the frame means 40 as desired. In this instance, the carriage 60, as shown is in sliding engagement with a pair of longitudinally extending tubes 62, positioned in parallel relationship on a base member 41 on the frame means 40 that is suitably positioned on the top member 18 of the frame 12. Suitable bushings 64 operatively position the carriage 60 on the tubes 62 for movement along the length of the top member 18 for controlling the position of the support platform 20, as hereinafter described.

This carriage 60 includes, in this instance, an upper shiv or sprocket 66 and a lower shiv or sprocket 68 that are in vertical alignment on an upper portion of the carriage, and are on different vertical sides of the piston rod 44. The piston rod suitably operably engages with the carriage 60 intermediate the sprockets 66 and 68, whereby extension and retraction of the piston rod moves the carriage along on the tube 62, and the carriage can be retracted to the dotted line position shown in FIG. 2.

This movement of the carriage 60, along the upper portion of the frame of the press, is translated to the support platform 20 as by a support chain 70, one end of which is suitably anchored at 72 to a part of the frame means 40. The support chain 70 extends from its anchor unit 72 to and over the upper sprocket 66 and then vertically downwardly to and engaging the lower sprocket 68. The chain 70 is also guided around a centering sprocket 74 that is operatively journalled on frame 12 or 40 as shown in FIG. 2 at 75. Such sprocket 74 normally is at least substantially centered with relation to the lateral margins of the support platform 20 whereby the chain 70 extends vertically downwardly from the centering sprocket 74 at all times, and is suitably anchored to and engaged with the support platform 20 as at 76.

LOADER SAFETY DEVICE—OPERATION

In the apparatus of the invention, for example, the cylinder 42 may have a six-inch diameter and an operative force push of 2,262 pounds exerted on the piston rod 44 when a fluid pressure of 80 pounds per square inch is supplied by the line or tube 50. The pressure switch 54 that is provided in the apparatus of the invention is connected to interlock with the drive circuit for the motor 26 whereby such motor is prevented from operating if less than 70 pounds per square inch is provided in the fluid pressure supply line 50.

The 80 pounds of pressure supplied to the blind end of this operative cylinder 42 is assumed to provide a total push of the piston rod of 1,131 pounds by assuming a mechanical loss of one half of the forces present in the cylinder. Such cylinder is provided for use with the loader platform 20 having an approximate weight of 1,000 pounds. Now, when a downstroke of the loader support platform 20 is desired, the operative drive motor 26 for the loader support platform must provide a downwardly exerted stroke or force of approximately 131 pounds to overcome the difference between the loader weight versus the cylinder holdback forces, i.e., 1,131 pounds minus 1,000 pounds equals 131 pounds. Likewise, on the upstroke of the loader support platform 20, the loader motor 26 normally will hold back upward movement of the loader support platform 20 by the difference in weight of the loader in relation to the cylinder lift force, or lift forces equal 1,131 pounds minus holdback force 1,000 pounds equals 131 pounds. It is desirable that the loader motor 26 be energized on the upstroke of the loader support platform to prevent excessive rapid upward movement of such support platform.

By the construction and design of the present apparatus, a "failsafe" apparatus has been provided so that in case the operative chains or drive means for the loader support platform 20, i.e., if drive chains 30, 32, etc., should ever break, then the entire loader platform assembly will slowly fall upwardly to a position at rest to the point of maximum upward travel of this support platform on the positioning side rail members.

Accordingly, from the foregoing, it is submitted that a novel and improved failsafe loader safety device has been provided in a tire curing press of the type described. Hence, the objects of the invention have been achieved.

While one complete embodiment of the invention has been disclosed herein, it will be appreciated that modification of this particular embodiment of the invention may be resorted to without departing from the scope of the invention.

What is claimed is:

1. In combination, a fluid pressure supply means and a loader safety device for a tire curing press including a frame having a pair of vertically extending side members and a top member secured to and extending between said side members, and a support platform operatively mounted on said side members for vertical movement therealong and mounting tire loader means thereon and characterized by
    a cylinder having a blind end and an operative end with a piston rod extending from its operative end, said cylinder being operatively secured to said frame top member, said pressure supply means connecting to the blind end of said cylinder,
    a carriage mounted for movement along said top member and engaging said piston rod which controls the position of said carriage,
    a flexible support means, operatively anchored at one end in relation to said frame, engaging a rotatable means mounted on said carriage and extending to and engaging said support platform to support the same whereby said cylinder can control the position of said support platform on said side members and, a drive system means for moving said support platform vertically of said side members, a normally closed pressure operated switch connected to said supply means; and said switch being connected to said drive system means to prevent drive thereof when the pressure in said supply means is below a predetermined value.

2. A combination as in claim 1 where said drive system normally supports said support platform, and said cylinder is of such a diameter and the pressure supplied by said pressure supply means to said cylinder is great enough to move said support platform to its upper position upon failure of said drive system.

3. A loader safety device for a tire curing press that includes a frame having a pair of vertically extending side members and a top member secured to and extending between said side members adjacent the upper ends thereof, a support platform mounted on said side members for vertical movement, and tire loader means mounted on said support platform and characterized by a pressure means with a piston rod operatively extending therefrom, a carriage operably mounted on said top member for horizontal movement and engaging said piston rod which controls the position of said carriage on said top member, a rotary means mounted on said carriage, a flexible support means operatively anchored at one end and extending to and engaging said support platform to support the same; said support means operatively engaging said rotary means and being adapted to raise and lower said support platform with respective extension and retraction of said piston rod, and said rotary means being positioned in a vertical plane, and said support means engages it and a rotary member operatively journalled on said frame at a fixed location above a center portion of said support platform.

4. A loader safety device for a tire curing press as in claim 3 where said pressure means has an operative axis positioned horizontally and said piston rod moves said carriage laterally of said frame.

5. A loader safety device for a tire curing press as in claim 3, where said pressure means and said piston rod can move said carriage laterally of said frame to control an operative length of said support means that depends from said rotary member, and said tire curing press includes a drive system for moving said support platform vertically of said side members, said pressure means forming a fail-safe support for said support platform.

6. A loader safety device for a tire curing press including a frame having a pair of vertically extending side members and a top member secured to and extending between said side members adjacent the upper ends thereof, a support platform mounted on said side members for vertical movement, and tire loader means mounted on said support platform, the loader safety device being a unit characterized by a frame means, a pressure means with a piston rod operatively extending therefrom, a carriage movably mounted on said frame means for movement thereon and engaging said piston rod which controls the position of said carriage transversely of said frame, a rotary means mounted on said carriage, a rotary member journalled on said frame means at a fixed location thereon, the safety device being adapted to have a flexible support means operatively anchored at one end to said frame means and to extend to and engage said support platform to support the same; which support means can be operatively threaded into engagement firstly with said rotary means and secondly, with said rotary member to have a free end of variable length dependent upon extension and retraction of said piston rod, and said rotary means being positioned in a vertical plane, and said rotary member is on said frame means to be positioned above a center portion of said support platform when said loader safety device is operatively positioned and a support means can extend to and engage said support platform.

* * * * *